No. 706,459. Patented Aug. 5, 1902.
W. A. C. SELKE.
APPARATUS FOR COPYING MODELS.
(Application filed Oct. 4, 1900.)
(No Model.)
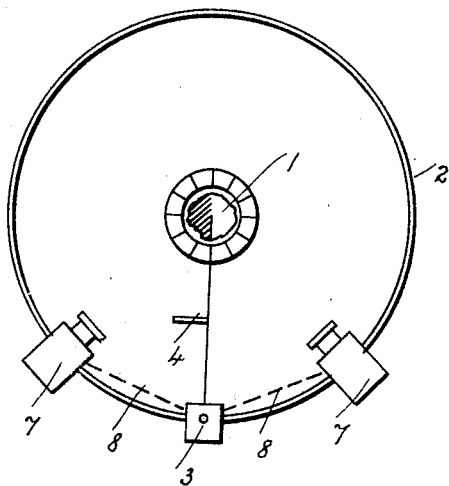
WITNESSES
Walter Allen
James M Shar
INVENTOR
W. A. C. Selke,
by Herbert W. T. Jenner.
Attorney

UNITED STATES PATENT OFFICE.

WILLY ALFRED CARL SELKE, OF BERLIN, GERMANY.

APPARATUS FOR COPYING MODELS.

SPECIFICATION forming part of Letters Patent No. 706,459, dated August 5, 1902.

Original application filed January 20, 1898, Serial No. 667,251. Divided and this application filed October 4, 1900. Serial No. 32,033. (No model.)

*To all whom it may concern:*

Be it known that I, WILLY ALFRED CARL SELKE, of Berlin, Germany, have invented certain new and useful Improvements in Apparatus for Copying Models, of which the following is a specification.

This application is a division of the application filed by me of January 20, 1898, Serial No. 667,251, and for which Letters Patent were issued to me on June 4, 1901, and numbered 675,417.

This invention consists in apparatus for taking a series of pictures of the model by means of photography.

In the drawing the figure is a plan view of the apparatus for taking the photographs.

The model 1 to be reproduced and which may be, for instance, a marble bust or a human head is permitted to remain stationary. A circular guide-rail 2 is arranged around the model, which is placed at the center of the rail. A number of lights 3, such as lamps, are arranged in a single plane and on one side of the model. A screen 4 is arranged with its edge between the lights and the model, so that one half of the model is illuminated with bright light and the other half is comparatively dark. Photographic cameras 7 are arranged one on each side of the screen, so that pictures can be taken simultaneously of the model from opposite sides. The cameras 7, lights 3, and screen 4 are all connected together by a connection or support 8 of approved construction, so that the said lights, screen, and cameras may be revolved about the axis of the model on the rail 2. Pictures are taken all around the model at prearranged distances apart and on planes which intersect the axis of the model. These pictures are then cut out and are used in effecting a reproduction of the model.

What I claim is—

1. The combination, with a centrally-arranged model; of a source of light arranged on one side of the model, a screen arranged with its edge between the light and the model, and a photographic camera arranged on one side of the screen; a support connecting together the said source of light, screen and camera; and means for changing the relative positions of the support and model so that a series of photographs may be taken around the model in planes which intersect its axis, substantially as set forth.

2. The combination, with a centrally-arranged model; of a source of light arranged on one side of the model, a screen arranged with its edge between the light and the model, and two photographic cameras arranged one on each side of the said screen; a support connecting together the said source of light, screen and cameras; and means for changing the relative positions of the support and model so that a series of photographs may be taken around the model in planes which intersect its axis, substantially as set forth.

In witness whereof I have signed this specification in the presence of two witnesses.

WILLY ALFRED CARL SELKE.

Witnesses:
 HENRY HASPER,
 WOLDEMAR HAUPT.